Patented Oct. 14, 1952

2,614,080

UNITED STATES PATENT OFFICE 2,614,080

LUBRICATING OIL ADDITIVE MATERIALS

Lester Marshall Welch, Madison, N. J., assignor to Standard Oil Development Company, a corporation of Delaware No Drawing. Application July 22, 1950,
Serial No. 175,473

12 Claims. (Cl. 252—59)

This invention relates to lubricating oil additives. Particularly the invention relates to materials which when incorporated into waxy mineral oils have the desirable characteristic of lowering the pour point thereof. More particularly, the invention relates to lubricating oil additive materials prepared by the alkylation of vinyl aromatic polymers.

The art of lubricating oil additive manufacture is familiar with various alkylated aromatic materials which modify the characteristics of oil blends when incorporated therein. Such materials as viscosity index improvers and pour point depressants obtained from the alkylation of aromatic compounds have wide-spread use in the lubricating industry.

Of particular importance are the alkylated aromatic compounds in which a long hydrocarbon chain is affixed to an aromatic nucleus. It has been found that if the hydrocarbon chain contains above about 12 carbon atoms the additive material is useful to modify wax crystallization characteristics of the paraffin wax contained in some lubricating oils at temperatures lower than normal. Shorter chain lengths than about $C_{12}$ are inefficacious as pour depressors, but function as thickeners or viscosity index improvers if the molecular weight of the compound is satisfactorily adjusted.

This invention has as its principal object the formation of an alkylated vinyl aromatic polymer which, in addition to lowering the pour point and increasing the viscosity index of waxy lubricating oils, into which it has been incorporated, maintains the wax modifying properties through various temperature fluctuations. This maintenance of wax modifying characteristics is referred to in the art as pour point stability.

Generally speaking, this invention involves the double alkylation of a polymer which consists of a linear hydrocarbon chain having suspended therefrom aromatic nuclei. The desirable multifunctional characteristics mentioned above are obtained by reacting a linear hydrocarbon-aromatic chain of the desired molecular weight with a long chain aliphatic compound in such a manner that the long chain aliphatic compound attaches to the aromatic nuclei, probably in the para position. The pour stability feature of the novel products of this invention are obtained by reacting a second aliphatic chain with the singly alkylated material in such a manner that the second aliphatic chain attaches to the aromatic nuclei in at least one position. As a final product there is obtained a long chain compound having suspended therefrom aromatic nuclei with substituent groups in both the para and the ortho positions.

To obtain the desired molecular weight it is advantageous that the long chain compound having suspended therefrom aromatic nuclei, be a polymer, that is, the large molecule built up from several monomeric groups. The most desirable starting material for the preparation of the products of this invention is a polymer of styrene hereinafter referred to as "polystyrene." This polymeric material is composed of monomeric units of styrene and has the following general structure:

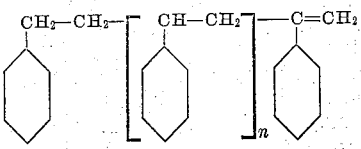

where $n$ is a number corresponding to the degree of polymerization. This polystyrene may be prepared by any of the methods known in the art.

It is essential that the alkylated polystyrene, according to this invention, have a final molecular weight within a range of from 7,000 to 20,000 Staudinger, preferably 10,000 to 16,000. Since the conditions of the alkylation reaction results in some molecular weight degradation the polystyrene used as a starting material should have a molecular weight within a range of from 10,000 to 70,000, preferably 20,000 to 40,000. If a polystyrene of molecular weight below about 10,000 is used the resulting product will not have the desirable optimum viscosity index improving qualities, and if the molecular weight of the polystyrene before alkylation is in excess of 70,000, difficulty is experienced in the alkylation due to the high viscosity of the system and gelation may occur.

The mechanics of the attachment of the linear hydrocarbon chains to the aromatic nuclei of the polystyrene are accomplished by the well-known Friedel-Crafts alkylation reaction. The catalyst used is preferably $AlCl_3$, although a list of operable catalysts would include $AlBr_3$, $AlBr_2Cl$, $AlClBr_2$, HF, $Al_2Br_5Cl$, and $AlIBr_2$.

The long chain aliphatic compound which is attached through the mechanics of the Friedel-Crafts reaction to the para position of the aromatic nuclei of the polystyrene is preferably a normal straight chain alpha olefin. It is preferred that the carbon chain of the olefin contain from 15 to 20 carbon atoms. However, those olefins containing from 12 to 22 carbon atoms are operable. If chain lengths below about $C_{12}$ or greater than about $C_{22}$ are used the desirable pour depressing characteristics of the product would be diminished. The olefinic material must be essentially free of diolefins, particularly those containing isolated diolefinic bonds, otherwise undesirable cross linkage and insolubility will result. Although it is preferred that the normal straight chain alpha olefins be used, if the proper chain length is selected, some slight branching of the carbon chain is not objectionable. For example, if the double bond occurs in such a position that a straight chain of greater than 12 carbon atoms remains, the pour depressing characteristics desired will be present in the final product.

Although optimum results are obtained when using a single olefin containing from 15 to 20 carbon atoms, economic considerations make it desirable in some instances to use a mixture of olefins averaging in carbon chain length from between 12 and 22 carbon atoms. Such olefins may be obtained from the dehydration of straight chain alcohols obtained from fatty materials, the cracking of straight chain paraffins such as paraffin wax or those olefins obtained as by-products from hydrocarbon synthesis processes.

As was explained above, the long chain hydrocarbon group attached to the aromatic nuclei gives the desired wax modifying characteristics to the additive material. It has been found, however, that compounds originally exhibiting excellent properties as pour point depressants often lose their ability to modify the wax crystallization rate when subjected to temperature fluctuations. Since conditions of storage often entail temperature changes it is desirable that the pour point depressant lose none of its pour point depressing potency under varying temperature conditions. This stability has been achieved in the instant invention by a further modification of the aromatic nuclei of the polystyrene by the addition of a second aliphatic chain. Although the exact reason for this increased stability is not known, it is postulated that the unsymmetrical aromatic nucleus obtained by the second alkylation step is responsible for the increased stability.

As the second alkylating agent there is used an olefin having a chain length within a range of from 2 to 10 carbon atoms, preferably an olefin having a carbon chain length of from $C_4$ to $C_6$. This second alkylating agent is attached to the aromatic nuclei of the polystyrene by a Friedel-Crafts reaction using any of the well-known catalysts outlined above. In this instance, $AlCl_3$ is again the preferred catalyst. This second alkylation probably occurs on the ortho positions of the aromatic nuclei and the alkylating conditions may be so controlled that both ortho positions are alkylated, however, the alkylation of only one of the two available ortho positions will also give the desired unsymmetrical arrangement.

The normal procedure for the process of this invention is as follows:

A polystyrene of the desired molecular weight is dissolved in an excess of an inert polar solvent. The desired amount of a Friedel-Crafts catalyst in solid form is added to the solution and the long chain olefin in liquid form is added slowly. After the desired amount of the long chain olefin has been added, addition of the short chain olefin is begun and continued until the calculated amount, sufficient to alkylate the desired number of positions, is completed.

The resulting final product is then purified by any of the well-known procedures, such as the addition of an alcohol to quench the reaction and precipitate the product, removal of solid particles by filtration and repurification of the precipitated product. Commercially, the reaction mixture might be quenched with alcohol, stripped of the major proportion of the solvent, diluted with a lubricating oil base to the desired concentration of polymer in oil (20% to 50%) steam stripped to remove the last traces of the solvent, and finally filtered to remove catalyst residues.

Any of the well-known solvents are operable in this process, it being essential that only two conditions are met: (1) the solvent selected must dissolve the polystyrene readily and (2) it must not be reactive under the alkylation conditions used in the operation. Preferred solvents include tetrachloroethylene, carbon disulfide, chlorinated aromatics such as the mono- and dichlorobenzenes, nitrobenzene, and the like.

The limitations upon the temperature of the reaction are those limitations with which the art is well familiar. To a certain extent the choice of catalyst and diluent will determine the temperature range. That is to say, temperatures within a range of from 30° F. to 120° F. are operable when using $AlCl_3$ catalyst and, under ordinary conditions temperatures within a range of 45 to 90° F. preferred. Those familiar with the art will recognize that temperatures higher than 120° F. tend to increase the molecular weight degradation of the final product and those lower than about 30° F. are disadvantageous due to technical difficulties, particularly in plant operation. The use of certain diluents, such as nitrobenzene, tend to reduce the activity of the catalyst and therefore higher temperatures can be used when nitrobenzene is present in the reaction mixture. When HF is used as a catalyst, somewhat lower temperatures are preferred. The time of the reaction will depend, of course, upon the other variables. The reaction must proceed for a period of time sufficient to complete the alkylation which ordinarily will occur in from 1 to 3 hours.

The proportions in which the ingredients are mixed will depend upon the final product desired. For optimum results, however, it is desired that equimolar proportions of the styrene monomer making up the polystyrene and the long chain olefin are used. The molar proportions of the short chain olefin used may vary from 0.5 to 2.0 (olefin to monomer) depending upon the extent of substitution desired. It is not essential, of course, that every aromatic nucleus be alkylated in order to obtain desirable results and, therefore, the proportions of the alkylating agents may be varied. Optimum proportions are as given above, however.

The products of this invention may be incorporated into any of the various lubricating oils known to the art, whether natural or synthetic. To obtain optimum pour depressing action from 0.01% to 5.0% by weight, based on the total composition, of the alkylated polystyrene is used. When viscosity index improvement is desired from 0.2% to 10.0% by weight of the alkylated polystyrene is blended with the desired lubricating oil base.

Concentrations of the additive material, made by adding the alkylated polystyrene to the lubricating oil base to be used, may be prepared for ease in handling, storage, and the like. In this instance from 15% to 50% by weight of the additive material is blended with the lubricating oil base. This concentrate is then subsequently diluted to obtain a final product within the ranges noted above.

The preparation of the materials of this invention will be more clearly explained by referring to the following examples.

*Example I*

25 grams (0.25 mol) of polystyrene having a molecular weight of approximately 30,000 Staudinger was dissolved in 400 ml. of tetrachloroethylene. 25 grams (0.25 mol) of pulverized AlCl₃ was added to the solution. There was then added in a dropwise manner over a period of about 30 minutes, 60 grams (0.25 mol) of octadecene-1 and the temperature of the reaction maintained between 40 and 45° F. After the completion of the addition of the octadecene-1, 35 grams (0.50 mol) of commercially available mixed amylenes were added over a period of 35 minutes, the reaction being maintained within a range of 40° F. to 50° F. After the amylenes were all added the catalyst was quenched by the addition of an excess of isopropanol and the product precipitated. The crude product was dissolved in naphtha, filtered and reprecipitated by addition of isopropanol. The product was then dried in a vacuum oven at 100° F. for 5 hours. There was obtained 64 grams of a semi-solid product which was equivalent to 53% of the theoretical yield. The product had a molecular weight of 15,000 Staudinger.

*Example II*

A reaction identical to that of Example I was carried out except that no secondary alkylating agent was employed. After the octadecene-1 was added and the alkylation completed the reaction was quenched and the product recovered as in the preceding example. In this reaction 55 gms. of polymer (65% of theory) was recovered. The molecular weight of the semi-solid product was about 16,000 Staudinger. The viscosity index and pour depressant action of this polymer is given in Table I.

*Example III*

(a) Twenty-five grams of polystyrene was dissolved in 200 ml. of o-dichlorobenzene and 25 grams of pulverized AlCl₃ was added to the solution in a reaction vessel. Octadecene-1 (60 gms.) was slowly added over a period of 2 hours and the temperature was held between 75° F. and 85° F. About 70 gms. of viscous liquid product was recovered.

(b) A sample of this product was further alkylated by passing isobutylene through a solution of the product in the presence of AlCl₃ catalyst. The pour depressant characteristics of the two products in the test oil described above are shown in Table I below.

The materials of this invention have the desirable characteristics of lowering the pour point and also of increasing the viscosity index (VI), that is, of descreasing the rate of change of viscosity with temperature of the oils with which they are blended. In addition, the materials of this invention furnish a more stable pour point, that is to say, their pour depressing potency is not noticeably decreased by temperature fluctuations. These desirable features are brought out by the following.

Various concentrations of the materials obtained in accordance with the examples above were prepared using as a base oil a Mid-Continent distillate having a viscosity at 210° F. of 42 S. U. S. and a viscosity index of 100. Viscosities of these blends were taken according to standard procedures and the viscosity indices obtained by charting procedures. The blends were also submitted to the standard A. S. T. M. pour point tests and readings taken at various temperatures. Four stability data on the blends were obtained according to the procedure outlined in the article entitled "S. O. D. pour stability tests, cycle A" reported on pages 34–44 of the "SAE Quarterly Transactions," volume 2, No. 1, January 1948. In this test the sample is rapidly cooled to 15° F., warmed slowly to 34° F. and held at that temperature for 24 hours, warmed gradually to 50° F. and then cooled to −20° F. at the rate of 1° F. per hour. The temperature at which the blend ceases to show fluidity is then reported as the stable pour point.

The results of these test procedures on the blends of materials of this invention are set out in Table I below.

TABLE I

*Inspection tests on oil blends of alkylated polystyrene additives*

| Percent of Additive | Viscosity at 100° F. (S. U. S.) | Viscosity at 210° F. (S. U. S.) | Viscosity Index | ASTM Pour Point (° F.) | Stable Pour Point, Cycle A (° F.) |
|---|---|---|---|---|---|
| Test Oil | 159.6 | 43.8 | 100 | +30 | +25 |
| Example I: | | | | | |
| 0.17 | | | | −20 | −20 |
| 0.25 | 165.4 | 44.8 | 110 | −20 | |
| 0.50 | 172.6 | 46.2 | 120 | −25 | −20 |
| 1.00 | 186.6 | 48.6 | 133 | −25 | |
| Example II: | | | | −30 | +20 |
| 0.10 | 163.2 | 44.2 | | −30 | +20 |
| 0.25 | 166.4 | 44.5 | 105 | −30 | +20 |
| 0.50 | 174.0 | 45.3 | 107 | −30 | +20 |
| 1.00 | 189.3 | 47.0 | 115 | | |
| Example III: | | | | | |
| (a) (singly alkylated material)— | | | | −25 | +25 |
| 0.25 | | | | −25 | +25 |
| 0.50 | | | | −30 | +25 |
| 1.00 | | | | | |
| (b) (doubly alkylated)— | | | | −25 | −10 |
| 0.25 | | | | −25 | −20 |
| 0.50 | | | | | |

An inspection of the data reported in Table I above will show the outstanding characteristics of the materials of this invention. Particular attention is called to the fact that in addition to raising the viscosity index 20 units and lowering the pour point of the base oil 55° F., a stable pour point of —20° F. was obtained when using 0.5% of the material of Example I.

The data clearly point out the effect of the secondary alkylation of the alkylated polymer. The material of Example II, identical with that of Example I except for the second alkylation, shows only 5° stable pour point reduction compared with 45° for the material of Example I. In Example III, this showing is repeated, the singly alkylated material having no effect, but the doubly alkylated material depressing the stable pour point 35° in 0.25% concentration.

To recapitulate briefly, this invention has as its object the preparation of a lubricating oil additive having both pour depressing and viscosity index improving characteristics. It contemplates the alkylation of a polymerized vinyl aromatic compound first with a long chain aliphatic hydrocarbon and second with a shorter chain aliphatic hydrocarbon compound utilizing the Friedel-Crafts reaction in both alkylation steps.

The additive materials of this invention are perfectly compatible with other of the various lubricating oil additives and may be blended successfully in oils containing other viscosity index improvers, other pour depressors, antioxidants, corrosion inhibitors, detergents and the like.

What is claimed is:

1. A process for the preparation of a multifunctional lubricant additive which comprises first reacting polystyrene having a molecular weight within a range of from 10,000 to 70,000 with an approximately equimolar proportion of a linear aliphatic monoolefin having from 12 to 22 carbon atoms in the presence of a Friedel-Crafts catalyst and reacting the product thus formed with approximately 2 molar proportions, based on the polystyrene of a linear aliphatic monoolefin having from 2 to 10 carbon atoms in the presence of a Friedel-Crafts catalysts to obtain a final product having a molecular weight within a range of from 7,000 to 20,000.

2. A process for the preparation of multifunctional lubricant additives which comprises the steps of reacting a polystyrene having a molecular weight within a range of from 20,000 to 40,000 with approximately equimolar proportions of a linear aliphatic monoolefin having from 15 to 20 carbon atoms in the presence of a Friedel-Crafts catalyst at a temperature within a range of from 30° F. to 90° F. and subsequently reacting the product thus formed with approximately 2 molar proportions of a second linear aliphatic monoolefin having from 4 to 6 carbon atoms in the presence of a Friedel-Crafts catalyst at a temperature within a range of from 30 to 90° F. for a period of time sufficient to obtain a final product having a molecular weight within a range of from 10,000 to 16,000.

3. A process for the preparation of lubricant additives which have the characteristic of increasing the viscosity index, lowering the pour point and decreasing the stable pour point of waxy mineral oils into which they have been incorporated which comprises dissolving polystyrene having a molecular weight within a range of from 20,000 to 40,000 in an inert polar solvent, adding thereto approximately an equimolar proportion, based on the weight of the styrene monomer, of a linear aliphatic monoolefin having from 15 to 20 carbon atoms per molecule and approximately an equimolar proportion, based on the weight of the styrene monomer, of AlCl₃, maintaining a reaction temperature within a range of from 45° F. to 75° F. for a period of time sufficient to substitute one aliphatic group on the para position of each aromatic nuclei, subsequently adding approximately two molar proportions, based on the weight of the styrene monomer, of a second linear aliphatic monoolefin having from 4 to 6 carbon atoms per molecule, maintaining a reaction temperature within a range of from 45° F. to 75° F. for a period of time sufficient to substitute a linear aliphatic hydrocarbon molecule on at least one ortho position of each aromatic nuclei, and obtaining a final product having a molecular weight within a range of from 10,000 to 16,000.

4. A process for the preparation of lubricant additive materials having the desirable characteristic of increasing the viscosity index, lowering the pour point and decreasing the stable pour point of waxy mineral lubricating oils into which they have been incorporated which comprises dissolving polystyrene having a molecular weight of approximately 30,000 in an excess of tetrachloroethylene, adding to the solution an approximately equimolar proportion based on the styrene monomer of pulverized AlCl₃, adding thereto approximately an equimolar proportion based on the styrene monomer of octadecene-1, maintaining a reaction temperature within a range of from 45° F. to 75° F. for from ½ to 1 hour, subsequently adding approximately two molar proportions based on the styrene monomer of a mixture of amylenes, maintaining a reaction temperature of from 45° F. to 75° F. for from ½ to 1 hour and obtaining therefrom a final product having a molecular weight of approximately 15,000.

5. A lubricating oil additive material having multifunctional properties which has been prepared by first reacting polystyrene having a molecular weight within a range of from 10,000 to 70,000 with an approximately equimolar proportion of a linear aliphatic monoolefin having from 12 to 22 carbon atoms in the presence of a Friedel-Crafts catalyst and reacting the product thus formed with approximately 2 molar proportions, based on the polystyrene of a linear aliphatic monoolefin having from 2 to 10 carbon atoms in the presence of a Friedel-Crafts catalyst to obtain a final product having a molecular weight within a range of from 7,000 to 20,000.

6. A lubricating oil additive material having multifunctional properties which has been prepared by first reacting polystyrene having a molecular weight within a range of from 20,000 to 40,000 with approximately equimolar proportions of a linear aliphatic monoolefin having from 15 to 20 carbon atoms in the presence of a Friedel-Crafts catalyst at a temperature within a range of from 30° F. to 90° F. and subsequently reacting the product thus formed with approximately 2 molar proportions of a second linear aliphatic monoolefin having from 4 to 6 carbon atoms in the presence of a Friedel-Crafts catalyst at a temperature within a range of from 30° F. to 90° F. for a period of time sufficient to obtain a final product having a molecular weight within a range of from 10,000 to 16,000.

7. A lubricating oil additive material having multifunctional properties which has been prepared by first reacting polystyrene having a molecular weight within a range of from 20,000 to 40,000 in an inert polar solvent, adding thereto approximately an equimolar proportion, based on the weight of the styrene monomer, of a linear aliphatic monoolefin having from 15 to 20 carbon atoms per molecule and approximately an equimolar proportion, based on the weight of the styrene monomer, of AlCl3, maintaining a reaction temperature within a range of from 45° F. to 75° F. for a period of time sufficient to substitute one aliphatic group on the para position of each aromatic nuclei, subsequently adding approximately two molar proportions, based on the weight of the styrene monomer, of a second linear aliphatic monoolefin having from 4 to 6 carbon atoms per molecule, maintaining a reaction temperature within a range of from 45° F. to 75° F. for a period of time sufficient to substitute a linear aliphatic hydrocarbon molecule on at least one ortho position of each aromatic nuclei, and obtaining a final product having a molecular weight within a range of from 10,000 to 16,000.

8. A lubricating oil additive material having multifunctional properties which has been prepared by first reacting polystyrene having a molecular weight of approximately 30,000 in an excess of tetrachloroethylene, adding to the solution an approximately equimolar proportion based on the styrene monomer of pulverized AlCl3, adding thereto approximately an equimolar proportion based on the styrene monomer of octadecene-1, maintaining a reaction temperature within a range of from 45° F. to 75° F. for from ½ to 1 hour, subsequently adding approximately two molar proportions based on the styrene monomer of a mixture of amylenes, maintaining a reaction temperature of from 45° F. to 75° F. for from ½ to 1 hour and obtaining therefrom a final product having a molecular weight of approximately 15,000.

9. A lubricating composition consisting essentially of a major proportion of a waxy lubricating oil base having combined therein 0.01% to 10.0% by weight, based on the weight of the total composition, of an alkylated polystyrene which has been prepared by first reacting polystyrene having a molecular weight within a range of from 10,000 to 70,000 with an approximately equimolar proportion of a linear aliphatic monoolefin having from 12 to 22 carbon atoms in the presence of a Friedel-Crafts catalyst and reacting the product thus formed with approximately 2 molar proportions, based on the polystyrene of a linear aliphatic monoolefin having from 2 to 10 carbon atoms in the presence of a Friedel-Crafts catalyst to obtain a final product having a molecular weight within a range of from 7,000 to 20,000.

10. A lubricating composition consisting essentially of a major proportion of a waxy lubricating oil base having combined therein 0.01% to 10.0% by weight, based on the weight of the total composition, of an alkylated polystyrene which has been prepared by first reacting polystyrene having a molecular weight within a range of from 20,000 to 40,000 with approximately equimolar proportions of a linear aliphatic monoolefin having from 15 to 20 carbon atoms in the presence of a Friedel-Crafts catalyst at a temperature within a range of from 30° F. to 90° F. and subsequently reacting the product thus formed with approximately 2 molar proportions of a second linear aliphatic monoolefin having from 4 to 6 carbon atoms in the presence of a Friedel-Crafts catalyst at a temperature within a range of from 30° F. to 90° F. for a period of time sufficient to obtain a final product having a molecular weight within a range of from 10,000 to 16,000.

11. A lubricating composition consisting essentially of a major proportion of a waxy lubricating oil base having combined therein 0.01% to 10.0% by weight, based on the weight of the total composition, of an alkylated polystyrene which has been prepared by first reacting polystyrene having a molecular weight within a range of from 20,000 to 40,000 in an inert polar solvent, adding thereto approximately an equimolar proportion, based on the weight of the styrene monomer, of a linear aliphatic monoolefin having from 15 to 20 carbon atoms per molecule and approximately an equimolar proportion, based on the weight of the styrene monomer, of AlCl3, maintaining a reaction temperature within a range of from 45° F. to 75° F. for a period of time sufficient to substitute one aliphatic group on the para position of each aromatic nuclei, subsequently adding approximately two molar proportions, based on the weight of the styrene monomer, of a second linear aliphatic monoolefin having from 4 to 6 carbon atoms per molecule, maintaining a reaction temperature within a range of from 45° F. to 75° F. for a period of time sufficient to substitute a linear aliphatic hydrocarbon molecule on at least one ortho position of each aromatic nuclei, and obtaining a final product having a molecular weight within a range of from 10,000 to 16,000.

12. A lubricating composition consisting essentially of a major proportion of a waxy lubricating oil base having combined therein 0.01% to 10.0% by weight, based on the weight of the total composition, of an alkylated polystyrene which has been prepared by first reacting polystyrene having a molecular weight of approximately 30,000 in an excess of tetrachloroethylene, adding to the solution an approximately equimolar proportion based on the styrene monomer of pulverized AlCl3, adding thereto approximately an equimolar proportion based on the styrene monomer of octadecene-1, maintaining a reaction temperature within a range of from 45° F. to 75° F. for from ½ to 1 hour, subsequently adding approximately two molar proportions based on the styrene monomer of a mixture of amylenes, maintaining a reaction temperature of from 45° F. to 75° F. for from ½ to 1 hour and obtaining therefrom a final product having a molecular weight of approximately 15,000.

LESTER MARSHALL WELCH.

REFERENCES CITED

The following references are of record in the file of this patent:

UNITED STATES PATENTS

| Number | Name | Date |
| --- | --- | --- |
| 2,072,120 | Mikeska | Mar. 2, 1937 |
| 2,282,456 | Christmann et al. | Mar. 12, 1942 |

OTHER REFERENCES

Bachman et al.: J. Org. Chem. 12, 108–9 (1947).